US012578459B2

(12) United States Patent　　(10) Patent No.: US 12,578,459 B2
Mouawad et al.　　(45) Date of Patent: Mar. 17, 2026

(54) OBJECT DETECTION FROM SYNTHETIC APERTURE RADAR USING A COMPLEX-VALUED CONVOLUTIONAL NEURAL NETWORK

(71) Applicant: NORTHROP GRUMMAN SYSTEMS CORPORATION, Falls Church, VA (US)

(72) Inventors: Joseph Mouawad, La Mesa, CA (US); David Riley Elliott, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 298 days.

(21) Appl. No.: 18/525,243

(22) Filed: Nov. 30, 2023

(65) Prior Publication Data

US 2025/0180734 A1　　Jun. 5, 2025

(51) Int. Cl.
*G01S 13/90*　　(2006.01)
(52) U.S. Cl.
CPC ................................. *G01S 13/9023* (2013.01)
(58) Field of Classification Search
CPC ................................................... G01S 13/9023
See application file for complete search history.

(56) References Cited

U.S. PATENT DOCUMENTS 11,719,787 B2 * 8/2023 Santra ..................... G06N 3/063
342/450
2024/0134037 A1 * 4/2024 Smith ..................... G01S 13/87

FOREIGN PATENT DOCUMENTS

CN　　107341488 A　　11/2017
CN　　111723875 A　　9/2020
(Continued)

OTHER PUBLICATIONS

Zhang, et al.: "Complex-Valued Convolutional Neural Network and Its Application in Polarimetric SAR Image Classification," in IEEE Transactions on Geoscience and Remote Sensing, vol. 55, No. 12, pp. 7177-7188, Dec. 2017, doi: 10.1109/TGRS.2017.2743222. (Year: 2017).*

(Continued)

*Primary Examiner* — Vladimir Magloire
*Assistant Examiner* — Nazra Nur Waheed
(74) *Attorney, Agent, or Firm* — Tarolli, Sundheim, Covell & Tummino LLP

(57) ABSTRACT

Systems and methods are provided for object detection. A radar interface receives complex-valued data representing a region of interest from a synthetic aperture radar system. A complex-valued convolutional neural network includes a plurality of convolutional layers and provides an output indicating if objects are present in the region of interest. Each convolutional layer includes a complex-valued kernel that is applied to an input. The kernel includes a first set of weights that is applied to each of real and imaginary components of the input to provide respective first and second convolution products and a second set of weights applied to each of real and imaginary components of the input to provide respective third and fourth convolution products. A difference between the first and fourth convolution products provides a real output component and a sum of the second and third convolution products provides an imaginary output component.

14 Claims, 4 Drawing Sheets

(56) References Cited

FOREIGN PATENT DOCUMENTS

| | | | |
|---|---|---|---|
| CN | 112101251 | A | 12/2020 |
| CN | 112395987 | A | 2/2021 |
| CN | 114049551 | A | 2/2022 |

OTHER PUBLICATIONS

WOISR (Notification of Transmittal of the International Search Report and the Written Opinion of the International Search Authority, or the Declaration), for PCT/US2024/053708, mailed Feb. 12, 2025.

Zhang, et al.: "Complex-Valued Convolutional Neural Network and Its Application in Polarimetric SAR Image Classification," in IEEE Transactions on Geoscience and Remote Sensing, vol. 55, No. 12, pp. 7177-7188, Dec. 2017, doi: 10.1109/TGRS.2017.2743222.

* cited by examiner

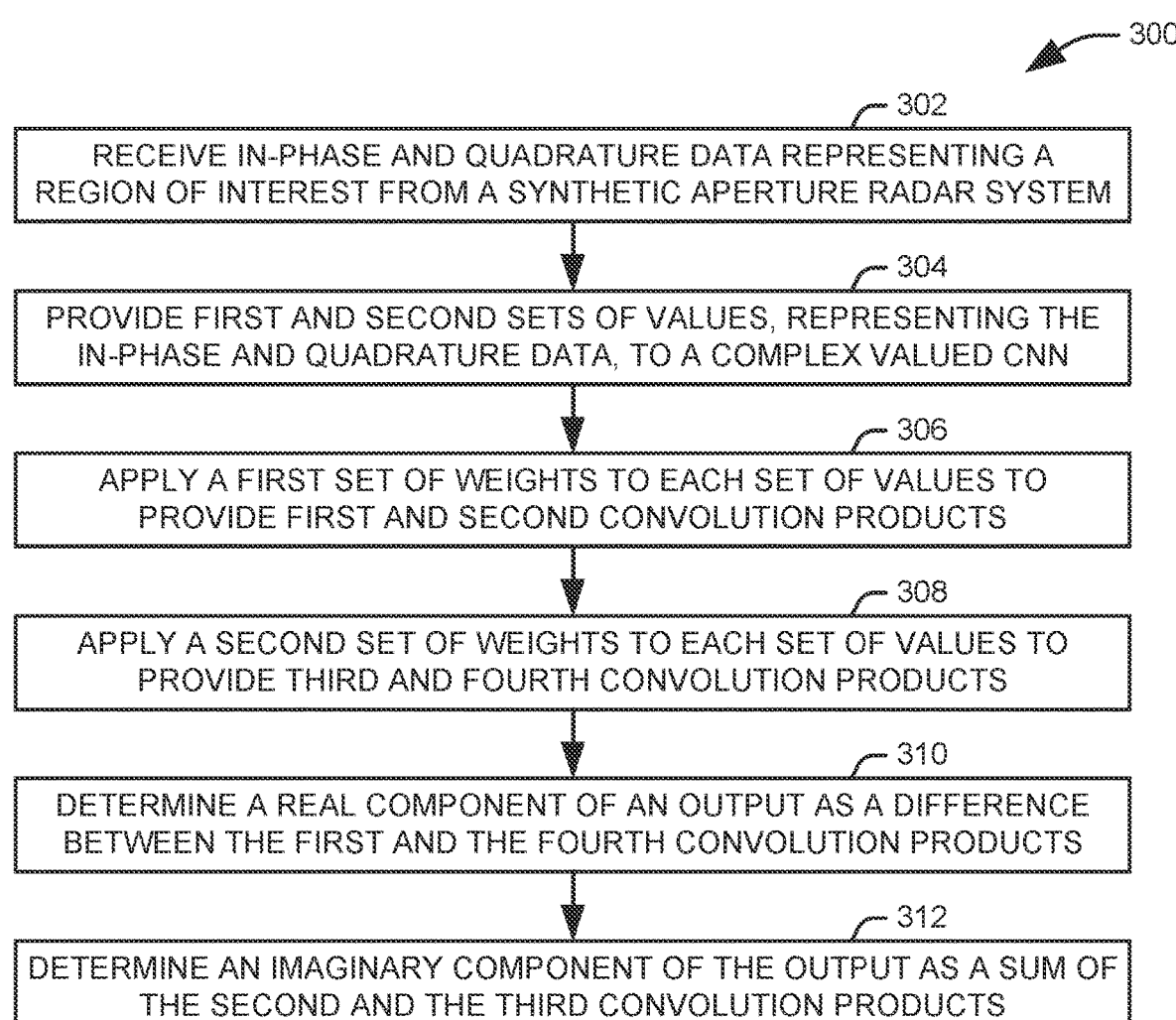

RECEIVE IN-PHASE AND QUADRATURE DATA REPRESENTING A REGION OF INTEREST FROM A SYNTHETIC APERTURE RADAR SYSTEM

PROVIDE FIRST AND SECOND SETS OF VALUES, REPRESENTING THE IN-PHASE AND QUADRATURE DATA, TO A COMPLEX VALUED CNN

APPLY A FIRST SET OF WEIGHTS TO EACH SET OF VALUES TO PROVIDE FIRST AND SECOND CONVOLUTION PRODUCTS

APPLY A SECOND SET OF WEIGHTS TO EACH SET OF VALUES TO PROVIDE THIRD AND FOURTH CONVOLUTION PRODUCTS

DETERMINE A REAL COMPONENT OF AN OUTPUT AS A DIFFERENCE BETWEEN THE FIRST AND THE FOURTH CONVOLUTION PRODUCTS

DETERMINE AN IMAGINARY COMPONENT OF THE OUTPUT AS A SUM OF THE SECOND AND THE THIRD CONVOLUTION PRODUCTS

FIG.3

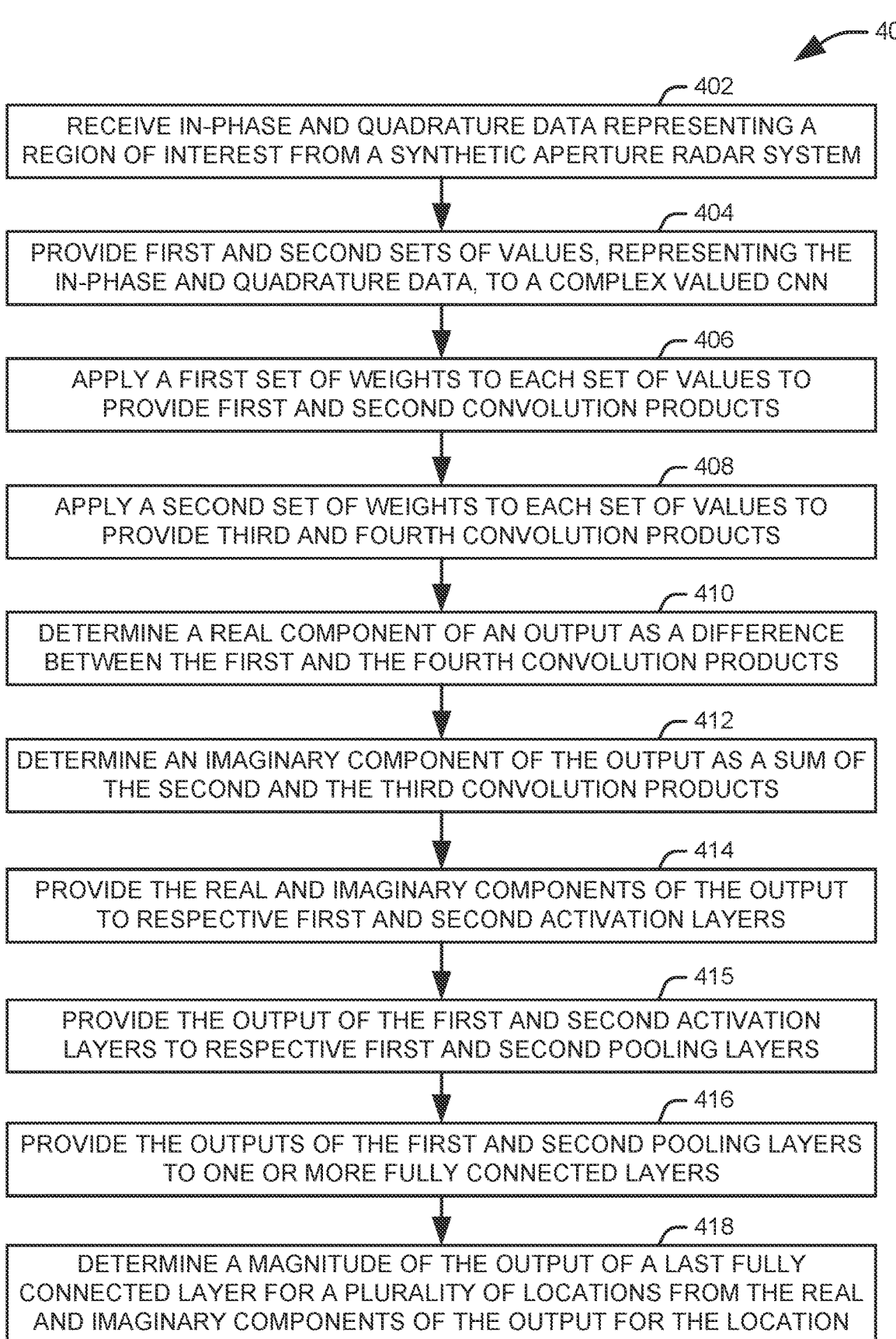

400

402
RECEIVE IN-PHASE AND QUADRATURE DATA REPRESENTING A REGION OF INTEREST FROM A SYNTHETIC APERTURE RADAR SYSTEM

404
PROVIDE FIRST AND SECOND SETS OF VALUES, REPRESENTING THE IN-PHASE AND QUADRATURE DATA, TO A COMPLEX VALUED CNN

406
APPLY A FIRST SET OF WEIGHTS TO EACH SET OF VALUES TO PROVIDE FIRST AND SECOND CONVOLUTION PRODUCTS

408
APPLY A SECOND SET OF WEIGHTS TO EACH SET OF VALUES TO PROVIDE THIRD AND FOURTH CONVOLUTION PRODUCTS

410
DETERMINE A REAL COMPONENT OF AN OUTPUT AS A DIFFERENCE BETWEEN THE FIRST AND THE FOURTH CONVOLUTION PRODUCTS

412
DETERMINE AN IMAGINARY COMPONENT OF THE OUTPUT AS A SUM OF THE SECOND AND THE THIRD CONVOLUTION PRODUCTS

414
PROVIDE THE REAL AND IMAGINARY COMPONENTS OF THE OUTPUT TO RESPECTIVE FIRST AND SECOND ACTIVATION LAYERS

415
PROVIDE THE OUTPUT OF THE FIRST AND SECOND ACTIVATION LAYERS TO RESPECTIVE FIRST AND SECOND POOLING LAYERS

416
PROVIDE THE OUTPUTS OF THE FIRST AND SECOND POOLING LAYERS TO ONE OR MORE FULLY CONNECTED LAYERS

418
DETERMINE A MAGNITUDE OF THE OUTPUT OF A LAST FULLY CONNECTED LAYER FOR A PLURALITY OF LOCATIONS FROM THE REAL AND IMAGINARY COMPONENTS OF THE OUTPUT FOR THE LOCATION

FIG. 4

OBJECT DETECTION FROM SYNTHETIC APERTURE RADAR USING A COMPLEX-VALUED CONVOLUTIONAL NEURAL NETWORK

TECHNICAL FIELD

The present invention relates to target detection in synthetic aperture radar, and more particularly, to the use of a complex-valued convolution neural network in object detection for synthetic aperture radar.

BACKGROUND

Synthetic Aperture Radar (SAR) sensing is a crucial capability that allows for continuous, reliable monitoring, as SAR is self-illuminating, operates in darkness, and can penetrate through clouds, while delivering high resolution imagery. With the importance of SAR and the major recent advances in deep learning in the optical field, SAR object detection (OD) has become a booming research topic. However, SAR data is significantly different from optical data. Specifically, the definition of "image" does not refer to only one SAR product, like it does with optical data where "image" refers to the data consisting of light reflection intensity for each pixel that can be represented by three colors with values between zero and two hundred fifty-five. SAR data is more sophisticated and goes through multiple signal processing stages and can be used at any of those stages, depending on the application, to generate numerous types of image products. SAR sensors measure time, amplitude, and phase of the echoes of the thousands of microwave pulses it emits. The amplitude component is the base SAR product that humans can visually inspect and analyze, while the phase component is not human friendly. Most of the available OD algorithms operate using the amplitude image only, and they use similar deep learning techniques to those used for the optical data. However, the phase data component packs crucial information about the sensed environment, which is completely ignored in state-of-the-art SAR object detectors. Even where the phase is used, the systems do not use a complex-valued neural network in their object detectors, but just a real-valued neural network that considers the phase just another real input channel.

SUMMARY OF THE INVENTION

In one aspect of the present invention, a system is provided for object detection in synthetic aperture radar data. The system includes a radar interface that receives complex-valued data representing a region of interest from a synthetic aperture radar system. A complex-valued convolutional neural network includes a plurality of convolutional layers. The complex-valued convolutional neural network processes the complex-valued data to provide an output indicating if objects are present in the region of interest. Each of the plurality of convolutional layers includes a complex-valued kernel that is applied to an input to the convolutional layer. The complex-valued kernel includes a first set of weights, representing a real component of the kernel, that is applied to each of a first set of values comprising the input, representing a real component of the input, and a second set of values comprising the input, representing an imaginary component of the input, to provide respective first and second convolution products, and a second set of weights, representing an imaginary component of the kernel, that is applied to each of the first set of values and the second set of values to provide respective third and fourth convolution products. A difference between the first convolution product and the fourth convolution product provides a real component of an output of the convolutional layer, and a sum of the second convolution product and the third convolution provides an imaginary component of the output of the convolutional layer.

In another aspect of the present invention, a method is provided. In-phase and quadrature data representing a region of interest is received from a synthetic aperture radar system. The in-phase and quadrature data are provided as respective first and second set of values to a complex-valued convolutional neural network that includes a plurality of complex-valued convolutional layers. At each of the plurality of convolutional layers, a complex-valued kernel is applied. The complex-valued kernel includes a first set of weights, representing a real component of the kernel, that is applied to each of the first set of values and the second set of values to provide respective first and second convolution products, and a second set of weights, representing an imaginary component of the kernel, that is applied to each of the first set of values and the second set of values to provide respective third and fourth convolution products. A real component of an output of each convolutional layer is determined as a difference between the first convolution product and the fourth convolution product, and an imaginary component of an output of each convolutional layer is determined as a sum of the second convolution product and the third convolution product.

In a further aspect of the present invention, a system is provided for object detection in synthetic aperture radar data. The system includes a radar interface that receives complex-valued data representing a region of interest from a synthetic aperture radar system. A complex-valued object detector includes a convolutional neural network that includes a plurality of convolutional layers and a plurality of fully connected layers and processes the complex-valued data to provide an output indicating if objects are present in the region of interest and locations of the objects within the region of interest. The complex-valued object detector is trained on a plurality of annotated synthetic aperture radar images having either a set of objects at known locations and with known dimensions within the image, specified by locations and dimensions of abstractive rectangular bounding boxes engulfing the objects, or no object within the region of interest. The training uses a loss function that has a first term, representing error contributed by confidence values predicted for a first set of locations in the region of interest for which an object is present within a given image of the plurality of images as compared to a set of ground truth confidence values, and a second term, representing error contributed by confidence values predicted for a second set of locations in the region of interest for which no object is present within the given image of the plurality of images, as compared to the set of ground truth confidence values. The first term is weighted by a first coefficient that is different from a second coefficient used as a weight for the second term.

BRIEF DESCRIPTION OF THE DRAWINGS

FIG. 3 illustrates one example of a method for processing synthetic aperture radar data in a complex-values convolutional layer;

FIG. 4 illustrates another example of a method for detecting an object in synthetic aperture radar data.

DETAILED DESCRIPTION

As used herein, a "convolutional layer" is a layer within a neural network that uses learnable filters, called kernels, and convolves them with the input.

As used herein, a "convolutional neural network" refers to any neural network having at least one convolutional layer.

Figure 1:
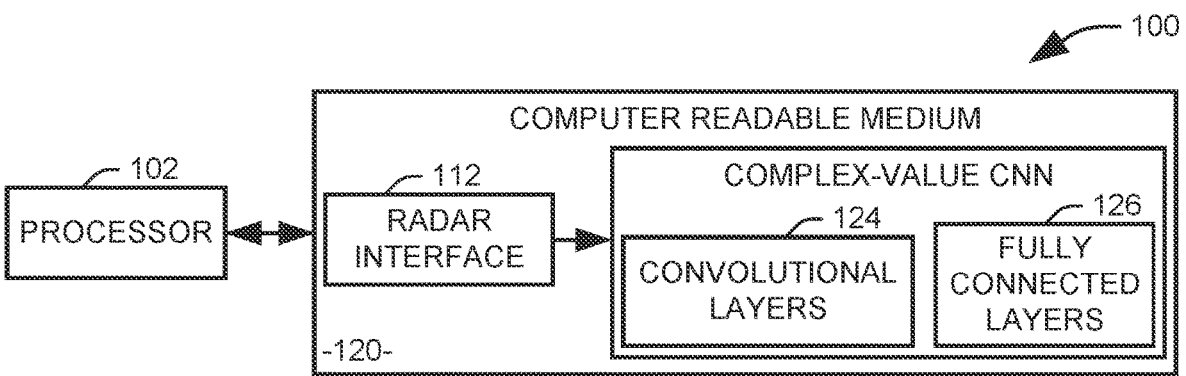
FIG. 1 illustrates one example of a complex value object-detection system.

FIG. 1 illustrates one example of a complex valued object-detection system 100 comprising a processor 102 and a non-transitory computer readable medium 110 that stores executable instructions for detecting objects in a synthetic aperture radar output. The executable instructions include a radar interface 112 that receives complex-valued data representing a region of interest from a synthetic aperture radar system (not shown). The radar interface 112 includes appropriate instructions for receiving and appropriately formatting radar returns provided from the synthetic aperture radar system. The radar interface 112 outputs a set of complex-valued data representing the region of interest to a complex-valued convolutional neural network.

The complex-valued convolutional neural network 120 includes a plurality of convolutional layers 124 and, in some implementations, one or more fully-connected layers 126. The complex-valued convolutional neural network 120 processes the complex-valued data to provide an output indicating if an object is present within the region of interest. It will be appreciated that, in some implementations, the output of the convolutional neural network can further indicate either or both of the locations of objects within the region of the interest and one or more dimensions for each of the detected objects. Each of the plurality of convolutional layers includes a complex-valued kernel that is applied to an input to the convolutional layer. The complex-valued kernel includes a first set of weights, representing a real component of the kernel, and a second set of weights, representing an imaginary component of the kernel. It will be appreciated that both sets of weights are stored as real values, despite the second set of weights representing an imaginary component of the complex kernel. The first set of weights is applied to each of a first set of values comprising the input, representing a real component of the input, and a second set of values comprising the input, representing an imaginary component of the input, to provide respective first and second convolution products. The second set of weights is applied to the first and second sets of input values to provide respective third and fourth convolution products. A real component of the output of the system is provided as a difference between the first convolution product and the fourth convolution product. An imaginary component of the output is provided as the sum of the second convolution product and the third convolution product.

In one example, the system 100 can include an activation layer, either after each convolutional layer and fully-connected layer, or after sets of one or more of these layers. Activation is handled separately for the real and imaginary components of the output of each layer or set of layers, with the value for that component provided to the activation function. Accordingly, the system includes a first set of pooling layers associated with real values and a second set of pooling layers associated with the imaginary values. It will be appreciated that the imaginary component of the output, while it represents an imaginary value, is stored as a real value, and can be provided to the activation function without modification. The activation layer can include, for example, a sigmoid function, a rectified linear unit, a step function, or a hyperbolic tangent function. In one example, a rectified linear unit function is used. The system 100 can further include a plurality of pooling layers, each following a set of one or more convolutional layers. Like activation, pooling is handled separately for each of the real and imaginary components of the input provided to the pooling layer, with a first set of pooling layers associated with the real values and a second set of pooling layers associated with the imaginary values. In one example, the pooling layers are max pooling layers. It will be appreciated that a pooling layer can either precede or proceed an activation layer, for in both cases the output will be the same.

In one example, the system 100 can provide a single value for each of a plurality of locations associated with the region of interest representing the likelihood that the location contains an object. In one example, each location is a cell within a grid. In other implementations, the output can include a vector for each location, for example, provided as multiple channels, that include a confidence that an object is present, a location of a center of the object relative to the location, and dimensions of the object. In practice, channels can be included for multiple objects, each represented by a bounding box around the locations containing the object, with each location having output channels for a confidence, relative location, and dimensions for each object. The system 100 can also include a display capability that displays, on top of the original region of interest, the predicted bounding boxes indicating the presence of objects, along with the predicted class of a detected object for each detected object, and, for each object, a combined confidence that the detected object is present at its predicted location and that the dimensions of the bounding box corresponding to the detected object are correct.

The complex-valued object detection system 100, and more specifically, the convolutional neural network, can be trained on a plurality of annotated synthetic aperture radar images having either a set of objects at known locations and with known dimensions within the image, specified by locations and dimensions of abstractive rectangular bounding boxes engulfing the objects, or no object within the region of interest. In the illustrated implementation, the training algorithm aims to minimize a loss function that has a set of five terms. In a first term, x and y coordinates of a bounding box are parametrized to be offsets of a particular grid cell location, representing ground truth, so they are bounded between zero and one. The first term is the sum of square error (SSE) for the predicted offsets for each object in the radar returns in comparison to the ground truth values. A second term reflects the error between the predicted bounding box width and height and the true values of the bounding box width and height, normalized by the image width and height as to fall between zero and one. Since small deviations in large boxes matter less than in small boxes, a sum squared error of the square root of the errors in the bounding box dimensions are used. In one implementation, the first term and the second term are each weighted by a same coefficient.

The third and fourth terms represent the sum square difference between the predicted confidence and the ground truth confidence for cells with objects and cells without objects, respectively. In every image many grid cells could be empty of any object. This pushes the "confidence" scores of those cells towards zero, often overpowering the gradient from cells that do contain objects and makes the model unstable. Thus, the loss from confidence predictions for boxes that don't contain objects, is decreased, by weighting the fourth term with a coefficient. A fifth term represents a sum square error between the predicted class probabilities for each cell and their corresponding ground truth values.

Batch normalization can be used to more efficiently training the complex-value object detection system 100, such that each vector of training data, x, is normalized to a new vector, x', such that $$x' = V^{-\frac{1}{2}}(x - E[x]),$$

where E(x) is the mean value for the training data and V is a covariance matrix representing the complex training data. V can be determined from the covariance matrices, $V_{rr}$ and $V_{ii}$, for the real and imaginary components of the training data, as well as a joint covariance matrix, $V_{ir}$, as $V =$ $$\begin{array}{cc} V_{rr} & V_{ir} \\ V_{ir} & V_{ii} \end{array} = \begin{array}{cc} Cov(\text{real } (x), \text{real } (x)) & Cov(\text{real } (x), \text{imaginary } (x)) \\ Cov(\text{imaginary } (x), \text{real } (x)) & Cov(\text{imaginary } (x), \text{imaginary } (x)) \end{array},$$

$$.V^{-\frac{1}{2}}$$

can be determined from these submatrices as $$V = \begin{array}{cc} \dfrac{(V_{ii} + S_t)}{S_t T_t} & \dfrac{-V_{ir}}{S_t T_t} \\ \dfrac{V_{ir}}{S_t T_t} & \dfrac{(V_{rr} + S_t)}{S_t T_t} \end{array},$$

where $S_t = (V_{rr} * V_{ii} - V_{ir} * V_{ir})^{\frac{1}{2}}$ and $T_t = (V_{rr} + V_{ii} + 2S_t)^{\frac{1}{2}}$.

Accordingly, the resulting batch normalization function can be expressed as $BN(x) = \gamma x + \beta$, where $\gamma$ and $\beta$ are learnable parameters. The $\beta$ parameter is a complex parameter with two learnable components (real and imaginary), and $\gamma$ is a 2×2 positive semi-definite matrix with only three learnable components. Training can also use a plurality of dropout layers, with a first set of the dropout layers associated with the real values and a second set of the dropout layers associated with the imaginary values. Accordingly, a set of neurons determined as dropout neurons from the neurons representing real values and the neurons representing imaginary values are determined separately. The desirability of using dropout for any given layer can vary with the implementation.

Figure 2:
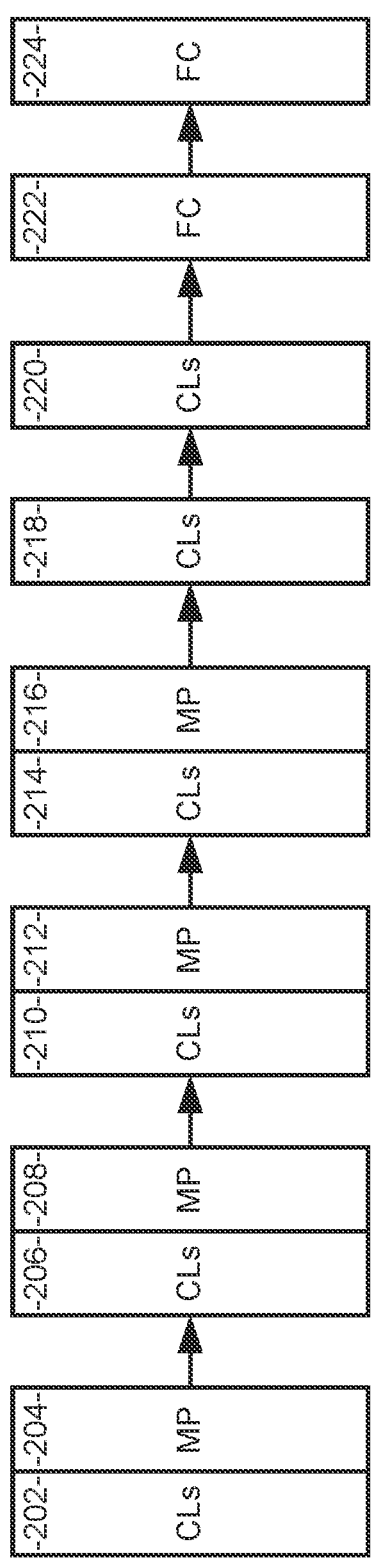
FIG. 2 illustrates a schematic diagram of one implementation of the convolutional neural network of FIG. 1.

FIG. 2 illustrates a schematic diagram 200 of one implementation of the convolutional neural network 120 of FIG. 1. Data from a synthetic aperture radar (SAR) system is received at a first set of convolutional layers (CLs) 202. In the illustrated implementation, a first set of convolutional layers 202 accepts an input set of I/Q data from the SAR system representing a region of interest and applies one or more complex convolutional kernels to the data. In the illustrated implementation, the set of first complex convolutional kernel includes one convolutional layer with a 7×7×64 kernel applied with a stride of two, resulting in 64 output channels, called feature maps, for each of the real and imaginary components. The width and height of each channel will depend on the dimensions of the original input image. A first max pooling layer (MP) 204 applies a two-by-two max kernel with a stride of two to the output of the first set of convolutional layers 202. During a two-by-two two stride max pooling, in each channel, real and imaginary channels, from every 2×2 data we keep only the maximum value to be passed as output, hence reducing the size of the input by half.

A second set of convolutional layers 206 accepts an output of the first max pooling layer 204 and applies a one or more complex convolutional kernels to the output. In the illustrated implementation, the second set of convolutional layers 206 includes one convolutional layer with a 3×3×192 kernel with stride of one, resulting in 192 output channels. A second max pooling layer 208 applies a two-by-two max kernel with a stride of two to the output of the second set of convolutional layers 206. A third set of convolutional layers 210 accepts an output of the second max pooling layer 208 and applies one or more complex convolutional kernels to the output. In the illustrated implementation, the third set of convolutional layers 210 includes four convolution layers, which apply, in order, a 1×1×128 kernel, a 3×3×256 kernel, a 1×1×256 kernel, and a 3×3×512 kernel, with stride of one, resulting in 512 output channels. A third max pooling layer 212 applies a two-by-two max kernel with a stride of two to the output of the third set of convolutional layers 210.

A fourth set of convolutional layers 214 accepts an output of the third max pooling layer 212 and applies one or more complex convolutional kernels to the output. In the illustrated implementation, the fourth set of convolutional layers 214 includes ten convolution layers, which apply, in order, a sequence of a 1×1×256 kernel, and a 3×3×512 kernel, repeated four times with all strides of 1, a 1×1×512 kernel, and a 3×3×1024 kernel with stride of one, resulting in 1024 output channels. A fourth max pooling layer 216 applies a two-by-two max kernel with a stride of two to the output of the fourth set of convolutional layers 214. A fifth set of convolutional layers 218 accepts an output of the fourth max pooling layer 216 and applies one or more complex convolutional kernels to the output. In the illustrated implementation, the fifth set of convolutional layers 218 includes six convolution layers, which apply, in order, a sequence of a 1×1×512 kernel, and a 3×3×1024 kernel with strides of one, repeated twice, a 3×3×1024 kernel with stride of one, and a 3×3×1024 kernel with a stride of two, resulting in 1024 output channels. A sixth set of convolutional layers 220 includes two convolution layers, which apply, in order, a sequence of a 3×3×1024 kernel, and a 3×3×1024 kernel, with strides of one both, resulting in 1024 output channels.

A first fully connected (FC) layer 222 of size 4096 receives the output of the sixth set of convolutional layers 220 and provides an output of size 4096 per complex number component (real and imaginary) to a second fully connected layer 224 whose size per complex component is equal to S×S×(5×B+C), where S×S is the size of the output regions grid, B is the number of boxes with predefined shapes to which we want to match the predicted box of a predicted object withing a grid cell, 5 is for the predicted values for each of the corresponding B predicted box: center location (x, y), width, height, and object confidence, and C is the number of classes of objects we train on. Each number of the C values will represent the likelihood of the predicted object, within the predicted box that has the highest confidence among the B boxes, being of type of a certain class. Layer 224 provides the output of the convolutional neural network.

The B boxes correspond to predefined box shapes that should be able to cover any form of object, for example one would be a vertical rectangle that could engulf a person and the other could be a horizontal rectangle that could engulf a car. The algorithm picks the prediction that shows highest confidence compatible with one of the B boxes, which is why it uses one set of class probabilities.

At the end, a non-maximal suppression technique is used, in order to mitigate the problem of having large objects or objects near the border of multiple cells which can be predicted by multiple cells at the same time. That technique, and in order to get rid of the excessive grid cells predictions, will pick the predicted box with the highest confidence and gets rid of all prediction boxes of the same object corresponding to other grid cells that have significant overlap with the chosen box, hence eliminating duplicate predictions from neighboring grid cells. It will be appreciated, however, that the system can be implemented without fully connected layers and with the use of networks and the combinations of such networks that are based on convolution layers such as RestNet and Feature Pyramid Networks and their variants, among other convolution-layers-based networks that we can implement as complex-valued networks. In such cases, we can for example, predefined boxes, referred to as anchors, can be located all over the image to cover the entire image, eliminating the need for the limitation of the B boxes for they are replaced with a lot more anchor boxes, and the need for the fully connected layers. In that case, for each predefined anchor the model learns to output adjustments to the best-fitting anchor box nearby its grid cell, to make the anchor align with the ground truth. The model will output a translation to the anchor in X and Y, and a scale to the anchor in width and height, and outputs whether the anchor is the most compatible with the form of the object, the confidence of the presence of the object, and the class probabilities of the object. The output could then be extracted from any feature maps throughout the whole network and fused and reshaped to present a vector prediction for each anchor, and thus for each area of the image. Also, any existing object detection optimization techniques that apply to convolution-layers-based networks, such as Self-adversarial Training (SAT), image augmentations, Hyperparameter Optimization with Genetic Algorithms, or more advanced loss functions, among others, that can be used to optimize the performance and efficiency of the detector, can be used here and applied to the complex-valued object detector.

For each fully connected layer 222 and 224, the complex output for each node has a real component equal to a difference between the real value of the output at the node and the imaginary component of the output at the node and an imaginary component equal to a sum of the real value of the output at the node and the imaginary component of the output at the node. It will be appreciated that a magnitude of the complex output can be determined for each location in the output of the second fully connected layer as the square root of the sum of the squares of the real value of the output for the location and the imaginary value of the output at the location.

It will be appreciated that each convolutional layer or set of convolutional layers can utilize an activation function that adjusts the output of the layer, generally to introduce a degree of non-linearity to the system. To this end, the illustrated system 200 uses a linear activation function for the second fully connected layer 224, with all other layers use a leaky rectified linear activation function in which positive values are passed unaltered, but negative values are reduced by a tenth. It will be appreciated that other activation functions, such as a hyperbolic tangent, a sigmoid function, or a standard rectified linear activation, can be employed. To accommodate the complex output of each layer, $Z_r + iZ_i$, the real and imaginary components are evaluated separately at the activation function using the magnitude of each component. Accordingly, for the leaky activation function described above, the real component is passed unchanged for $Z_r > 0$, and reduced for $Z_r \leq 0$. Similarly, the imaginary component is passed unchanged for $Z_i > 0$, and reduced for $Z_i \leq 0$, with the resulting values used for form the complex output.

In view of the foregoing structural and functional features described above in FIGS. 1-2, example methods will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some actions could in other examples occur in different orders and/or concurrently from that shown and described herein.

FIG. 3 illustrates one example of a method 300 for processing synthetic aperture radar data in a complex-values convolutional layer. At 302, in-phase and quadrature data representing a region of interest are received from a synthetic aperture radar system. At 304, the in-phase and quadrature data are provided as respective first and second set of values to a complex-valued convolutional neural network, comprising a plurality of complex-valued convolutional layers. At 306, a complex-valued kernel comprising a first set of weights, representing a real component of the kernel, is applied to each of the first set of values and the second set of values to provide respective first and second convolution products, and at 308, a second set of weights, representing an imaginary component of the kernel, that is applied to each of the first set of values and the second set of values to provide respective third and fourth convolution products. At 310, a real component of an output of each convolutional layer for the is determined as a difference between the first convolution product and the fourth convolution product. At 312, an imaginary component of an output of each convolutional layer is determined as a sum of the second convolution product and the third convolution product, representing the output imaginary component.

FIG. 4 illustrates an example of a method 400 for detecting an object in synthetic aperture radar data. At 402, in-phase and quadrature data representing a region of interest are received from a synthetic aperture radar system. At 404, the in-phase and quadrature data are provided as respective first and second set of values to a complex-valued convolutional neural network, comprising a plurality of complex-valued convolutional layers. At 406, a complex-valued kernel comprising a first set of weights, representing a real component of the kernel, is applied to each of the first set of values and the second set of values to provide respective first and second convolution products. At 408, a second set of weights, representing an imaginary component of the kernel, is applied to each of the first set of values and the second set of values to provide respective third and fourth convolution products. At 410, a real component of an output of each convolutional layer for the is determined as a difference between the first convolution product and the fourth convolution product. At 412, an imaginary component of an output of each convolutional layer is determined as a sum of the second convolution product and the third convolution product, representing the output imaginary component.

At 414, the real component of the output is provided to a first activation layer and the imaginary component of the output is provided to a second activation layer to provide a complex output for the convolutional layer. In one example, the activation layer is a rectified linear unit function. At 415, an output of the first activation layer is provided to a first pooling layer and an output of the second activation layer is provided to a second pooling layer. Accordingly, the pooling in the real component of the output and the imaginary component of the output occurs independently. At 416, an output of the first pooling layer and an output of the second pooling layer are provided to one or more (sequentially) fully connected layers to provide respective real and imaginary components of an output for the one or more fully connected layers for a plurality of locations as respective first and second pluralities of values. At 418, a magnitude of the output of the last fully connected layer is determined for each location of the plurality of locations, from the real and imaginary components of the output of the last fully connected layer, as the square root of the sum of the squares of a value of the first real plurality of values representing the location and a value of the second imaginary plurality of values representing the location.

In the one example, each location is represented by an amplitude value in each of a plurality of channels. Specifically, each location is evaluated to determine if it contains part of one or more objects within the image, defined by respective bounding boxes. Each bounding box represented by five channels, representing x and y coordinates of a center of the bounding box relative to the location, a length of the bounding box, a width of the bounding box, and a confidence that an object associated with the bounding box is present within the location. The output of the fully-connected layer is a set of locations, represented as grid cells, whose size per complex component is equal to $S \times S \times (5 \times B + C)$, where $S \times S$ is the size of the output regions grid, B is the number of boxes with predefined shapes to which we want to match the predicted box of a predicted object withing a grid cell, 5 is for the predicted values for each of the corresponding B predicted box: center location (x, y), width, height, and object confidence, and C is the number of classes of objects we train on. Each number of the C values will represent the likelihood of the predicted object, within the predicted box that has the highest confidence among the B boxes, being of type of a certain class.

Figure 5:
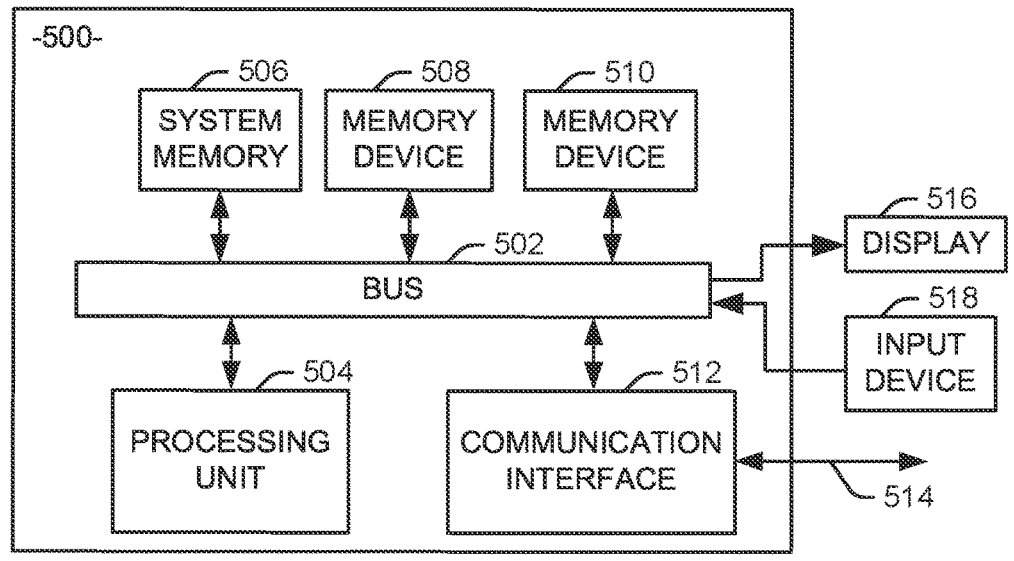
FIG. 5 is a schematic block diagram illustrating an example system 500 of hardware components capable of implementing examples of the systems and methods disclosed herein.

FIG. 5 is a schematic block diagram illustrating an example system 500 of hardware components capable of implementing examples of the systems and methods disclosed herein. For example, the system 500 can be used to implement the radar interface 112 and complex-valued convolutional neural network 120 of FIG. 1. The system 500 can include various systems and subsystems. The system 500 can include one or more of a personal computer, a laptop computer, a mobile computing device, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506 and 510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core. It will be appreciated that the processing unit 504 can include multiple processing units, including one or more graphic processing units (GPUs) used for training and implementing the complex-valued convolutional neural network 120 of FIG. 1.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings.

Additionally, or alternatively, the system 500 can access an external data source or query source through the communication interface 512, which can communicate with the system bus 502 and the communication link 514.

In operation, the system 500 can be used to implement one or more parts of a system in accordance with the present invention. Computer executable logic for implementing the diagnostic system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors.

Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), graphic processing units (GPUs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels, and/or various other storage mediums capable of storing that contain or carry instruction(s) and/or data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. Accordingly, the present invention is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the invention is critical or essential unless it is expressly stated as being "critical" or "essential."

What is claimed is:

1. A system for object detection in synthetic aperture radar data, the system comprising:
   a radar interface that receives complex-valued data representing a region of interest from a synthetic aperture radar system; and
   a complex-valued convolutional neural network, comprising a plurality of convolutional layers, that processes the complex-valued data to provide an output indicating if an object is present in the region of interest, wherein each of the plurality of convolutional layers comprises a complex-valued kernel that is applied to an input to the convolutional layer, the complex-valued kernel comprising a first set of weights, representing a real component of the kernel, that is applied to each of a first set of values comprising the input, representing a real component of the input, and a second set of values comprising the input, representing an imaginary component of the input, to provide respective first and second convolution products, and a second set of weights, representing an imaginary component of the kernel, that is applied to each of the first set of values and the second set of values to provide respective third and fourth convolution products, a difference between the first convolution product and the fourth convolution product providing a real component of an output of the convolutional layer and a sum of the second convolution product and the third convolution providing an imaginary component of the output of the convolutional layer.

2. The system of claim 1, wherein an output of the complex-valued convolutional neural network comprises a plurality of sets of values, each representing one of a plurality of grid squares represented by the output, each of the plurality of sets of values comprising a confidence that the grid square contains the center of an object, a width of a predicted box that can contain the object, a height of a predicted box that can contain the object, and a location of the center of a predicted box that can contain the object relative to the position of the grid square represented by the set of values, and the probabilities of the present object being of a certain class.

3. The system of claim 1, the complex-valued object detector being trained on a plurality of annotated synthetic aperture radar images each having either one or more objects at known locations and with known dimensions within the region of interest, specified by locations and dimensions of rectangular bounding boxes representing the objects, or no object within the region of interest.

4. The system of claim 1, the complex-valued convolutional neural network further comprising a plurality of pooling layers, wherein a first set of the plurality of pooling layers are associated with the first set of values and a second set of the plurality of pooling layers are associated with the second set of values, such that the pooling for each of the real component of the input and the imaginary component of the input are performed separately.

5. The system of claim 4, wherein the plurality of pooling layers are max-pooling layers.

6. The system of claim 1, the complex-valued convolutional neural network comprising a plurality of activation layers, with a first set of the plurality of activation layers associated with the first set of values and a second set of the plurality of activation layers associated with the second set of values.

7. The system of claim 6, wherein each of a subset of the plurality of activation layers uses a rectified linear unit function.

8. The system of claim 1, the complex-valued convolutional neural network being trained on a set of training data using a plurality of dropout layers, with a first set of the plurality of dropout layers associated with the first set of values and a second set of the plurality of dropout layers associated with the second set of values, such that a set of neurons determined as dropout neurons for each of the real component of the output of the convolutional layers and the imaginary component of the output of the convolutional layers are determined separately.

9. The system of claim 1, further comprising a display capability that displays, on top of the original region of interest, predicted bounding boxes indicating the presence of objects, along with the predicted class of a detected object for each detected object, and, for each object, a combined confidence that the detected object is present at its predicted location and that the dimensions of the bounding box corresponding to the detected object are correct.

10. A method comprising:

receiving in-phase and quadrature data representing a region of interest from a synthetic aperture radar system;

providing the in-phase and quadrature data as respective first and second set of values to a complex-valued convolutional neural network, comprising a plurality of complex-valued convolutional layers;

applying, at each of the plurality of convolutional layers, a complex-valued kernel comprising a first set of weights, representing a real component of the kernel, that is applied to each of the first set of values and the second set of values to provide respective first and second convolution products, and a second set of weights, representing an imaginary component of the kernel, that is applied to each of the first set of values and the second set of values to provide respective third and fourth convolution products;

determining a real component of an output of each convolutional layer as a difference between the first convolution product and the fourth convolution product; and determining an imaginary component of an output of each convolutional layer as a sum of the second convolution product and the third convolution product.

11. The method of claim 10, further comprising:

providing the real component of the output for at least one of the plurality of convolutional layers to a first activation layer; and providing the imaginary component of the output for at least one of the plurality of convolutional layers to a second activation layer.

12. The method of claim 11, wherein providing the output for the first set of values for at least one of the plurality of convolutional layers to the first activation layer, comprises providing the real component of the output for at least one of the plurality of convolutional layers to an activation layer using a rectified linear unit function.

13. The method of claim 11, further comprising:

providing an output of the first activation layer to a first pooling layer; and providing an output of the second activation layer to a second pooling layer, such that pooling in the real component of the output and the imaginary component of the output occurs independently.

14. The method of claim 13, further comprising:

providing an output of the first pooling layer and an output of the second pooling layer to at least one fully connected layer to provide a real component of an output for the at least one fully connected layer comprising a first plurality of values representing a corresponding plurality of locations and an imaginary component of the output of the at least one fully connected layer comprising a second plurality of values representing the plurality of locations; and determining a magnitude of the output of the at least one fully connected layer for a location of the plurality of locations from a value of the first plurality of values representing the location and a value of the second plurality of values representing the location.

* * * * *